(No Model.)
B. F. McCARTY.
SHEARS.
No. 326,768. Patented Sept. 22, 1885.
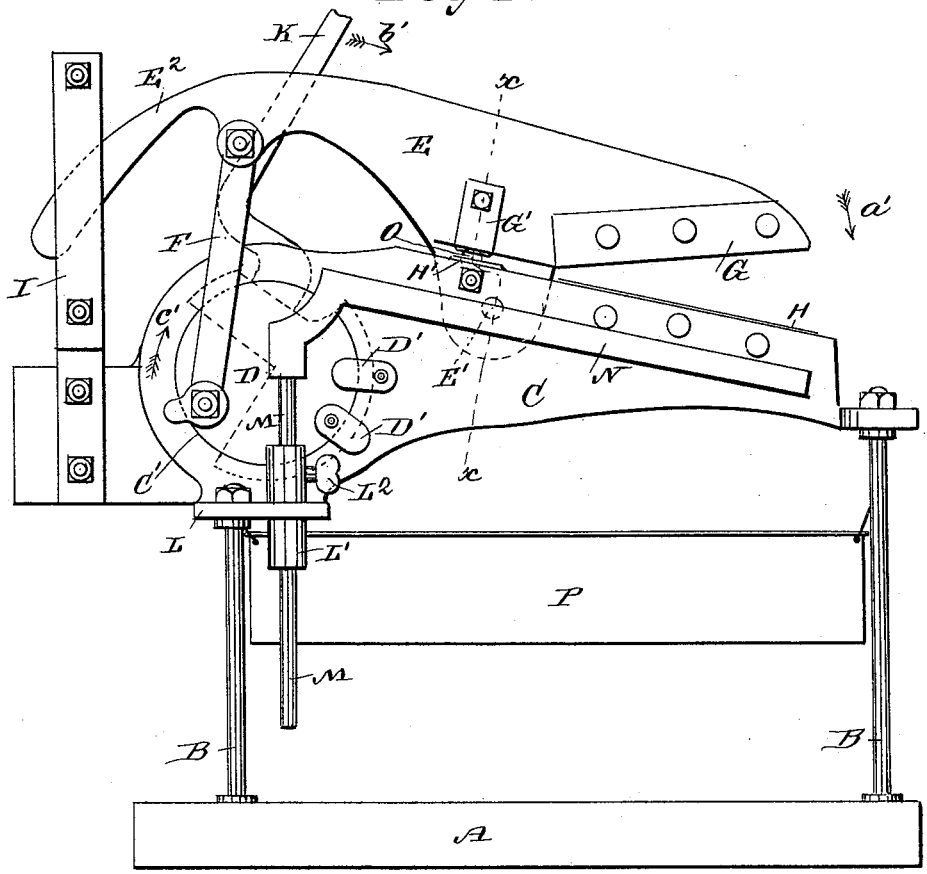
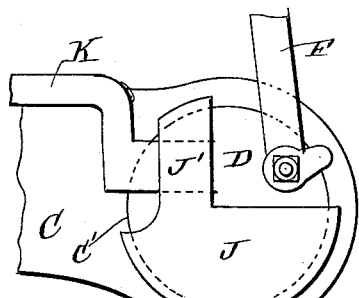
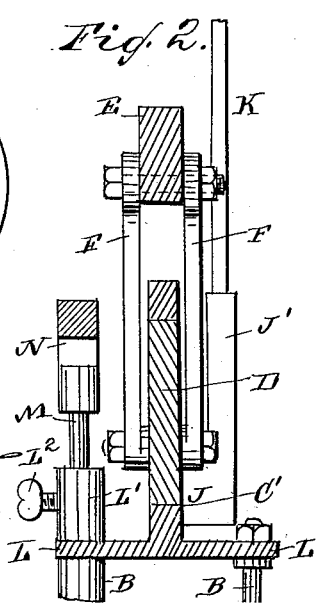
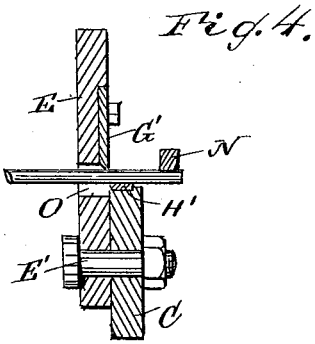
WITNESSES:
Theo. G. Hoster
C. Sedgwick
INVENTOR:
B. F. McCarty
BY Munn & Co
ATTORNEYS.

UNITED STATES PATENT OFFICE.

BENJAMIN FRANKLIN McCARTY, OF ROLLING PRAIRIE, INDIANA.

SHEARS.

SPECIFICATION forming part of Letters Patent No. 326,768, dated September 22, 1885.

Application filed July 10, 1885. (No model.)

*To all whom it may concern:*

Be it known that I, BENJAMIN FRANKLIN MCCARTY, of Rolling Prairie, in the county of La Porte and State of Indiana, have invented new and Improved Shears, of which the following is a full, clear, and exact description.

The object of my invention is to provide new and improved shears for conveniently cutting metal bars and sheet metal by hand-power.

The invention consists of a disk turned by a lever, of a pivoted arm carrying dies and connected by arms to the disk, and of an adjustable arm to prevent the metal from rising when being cut.

The invention also consists in various parts and details hereinafter more fully set forth and described.

Reference is to be had to the accompanying drawings, forming a part of this specification, in which similar letters of reference indicate corresponding parts in all the figures.

Figure 1 is a side elevation of my improvement. Fig. 2 is a vertical cross-section through the disk. Fig. 3 is a rear view of the disk and lever; and Fig. 4 is a vertical cross-section on the line $x\,x$ of Fig. 1.

The base A is provided with the standards B, on which is secured the frame C, having an aperture, C', in which is placed the disk D, held in the said aperture C' by the lugs D'. The shear-arm E is pivoted to the frame C at E', and is connected to the disk D by the arms F F, pivoted on each side of the disk D and the shear-arm E.

The shear-arm E is provided with the cutter G for cutting sheet metal, and with the cutter G' for cutting metal bars. The frame C is provided on its upper edge with corresponding cutters, H and H'. The pivoted shear-arm is also provided with the extension E², which moves in the guide I, bolted to the frame C.

The disk D is provided on one side with an offset, J, which, in connection with the lugs D', holds the disk in place in the aperture C, and on the offset J is formed the arm J', having an aperture in which the lever K is placed.

The sleeve L' is formed on the foot-piece L of the frame C, and is provided with the thumb-screws L², to adjust the bar M, carrying the arm N in the said sleeve.

The pivoted shear-arm E is provided with an aperture, O, formed directly under the cutter G', in which aperture O the bar of metal to be cut is placed, as shown in Fig. 4, and which aperture acts as a guide for the metal bar during the act of cutting.

The bar M, carrying the arm N, is adjusted in such a manner that the metal bar to be cut rests on the under edge of the arm N to prevent the outer end of the metal bar from rising when the cutter G' is cutting the said bar, as indicated in Fig. 4.

The sheet metal to be cut is placed on the stationary cutter H on the frame C, and cut by the cutter G, when the pivoted arm E is swung downward in the direction of the arrow $a'$, by moving the lever K in the direction of the arrow $b'$, which causes the disk D to turn in the direction of the arrow $c'$, whereby the connecting-arms F F are raised and impart a swinging motion to the shear-arm E. The metal bars are cut by the cutters G' H' on the reverse movement of the shear-arm E—that is, when the lever K is moved in the inverse direction of the arrow $b'$.

The box P is fastened to the standards B directly under the frame C, to receive the cut-off ends of the metal bars or the sheet metal.

Having thus described my invention, I claim as new and desire to secure by Letters Patent—

1. The combination of the frame C, the disk D, the connections F F, the shear-arm E, the cutters G G' and H and H', the adjustable bar M, provided with the arm N, and the lever K, substantially as shown and described.

2. The frame C, the cutters H and H', the adjustable bar M, provided with arm N, in combination with the disk D, provided with the offset J, the arm J', the lever K, the connections F F, the pivoted shear-arm E, and the cutters G and G', substantially as shown and described.

3. The frame C, having an aperture, C', the disk D, the lugs D', the offset J, the arm J′, and the lever K, in combination with the connections F F and the shear-arm E, substantially as shown and described.

4. The frame C, having an aperture, C′, the disk D, the lugs D′, the offset J, the arm J′, the lever K, and the guide I, in combination with the connections F and the shear-arm E, provided with the extension E², substantially as shown and described.

BENJAMIN FRANKLIN McCARTY.

Witnesses:
   JAMES C. ROOTS,
   EDGAR PRATT.